United States Patent Office 2,891,013
Patented June 16, 1959

2,891,013

PROCESS FOR PREPARING PLATINUM METAL CATALYSTS

John W. Myers, Bartlesville, Okla., assignor to Phillips Petroleum Company, a corporation of Delaware No Drawing. Application December 27, 1955
Serial No. 555,225

16 Claims. (Cl. 252—455)

This invention relates to a novel process for preparing supported platinum metal catalysts.

Numerous metals and metal oxides have been suggested and used as catalysts for such processes as hydrogenation, dehydrogenation, aromatization, cyclization, and similar hydrocarbon conversion processes. More recently, catalysts comprising platinum supported on a porous support, such as alumina, have come into use for the reforming of naphtha-containing fractions. Various methods for the preparation of these catalysts have been used and are proposed. For example, one method comprises precipitating the platinum onto porous alumina as platinous oxide by boiling an aqueous solution of $K_2PtCl_4$, containing the carrier or support, and then reducing the oxide with suitable reducing salts or other agents. Another method involves precipitating platinic sulfide in colloidal form from chloroplatinic acid by reacting it with a suitable compound of a nitrogen base, such as sulfide or polysulfide of ammonium, and then compositing the platinic sulfide with alumina and drying and calcining the composite. Platinum-containing catalysts prepared by methods which appear to differ only slightly often produce very different results in hydrocarbon conversion and other catalytic reactions.

I have devised a novel method of preparing platinum metal catalysts which is relatively simple and effective in producing platinum metal-containing catalyst of high and reproducible activity without the incorporation of halogens in the catalyst.

The principal object of the invention is to provide a novel process for preparing supported platinum metal-containing catalyst. Another object is to provide a novel process for preparing supported platinum metal catalysts free of halogens. It is also an object of the invention to provide a process for preparing supported platinum metal catalysts which are easily reproducible. Other objects of the invention will become apparent from a consideration of the accompanying disclosure.

The metals of the platinum family include platinum, palladium, osmium, iridium, rhodium, and ruthenium. Platinum is by far the most widely used metal of this group in catalytic processes and next in order comes palladium. While the process of the invention is applicable to the preparation of catalysts from any one or more of the metals of the platinum family, the ensuing discussion of the process will be directed to the preparation of platinum-containing catalysts, but it is to be understood that the methods are also applicable to the other metals of the family.

The process of the invention comprises reacting sulfuric acid with a halo acid of a platinum metal, such as chloro-, bromo-, or iodoplatinic acid, evaporating the resulting mixture until precipitate forms but short of complete dryness, dissolving the resulting precipitate in water, impregnating a suitable carrier with the resulting solution and finally drying and heating the resulting composite to activate the catalyst. The heating step is preferably conducted at a temperature in the range of 300 to 1200° F. in air. It may be desirable in some instances to follow the heating step in an oxygen-containing ambient with a heating step in a reducing ambient, such as hydrogen, and in some instances, it may be desirable to effect the heating step entirely in a hydrogen-containing ambient.

It is essential in the process to avoid evaporating the mixture obtained after reacting the chloroplatinic acid with the sulfuric acid to complete dryness because of the fact that the dark (almost black) residue obtained after evaporation to complete dryness is insoluble in water and is not operable in the process of the invention. It has been noted that the precipitate which forms upon evaporation is of a distinct orange color but this turns to a substantially black color when the evaporation is carried by heating to complete dryness. The black residue is substantially insoluble in water and cannot be utilized in accordance with the process of the invention to form an aqueous solution for impregnating the carrier.

The preferred support, or carrier material for the platinum metal, is alumina, but other suitable supports include mixtures of silica and alumina, silica, titania, zirconia, magnesia, and the like. All of these various support materials can be prepared by methods known in the art. Alumina, for example, while still in a wet state after precipitation may be combined with the platinum; or the alumina may be dried, formed into particles of uniform or irregular size and shape and calcined prior to commingling or impregnating with the platinum.

The platinum for compositing with the alumina is preferably obtained from chloroplatinic acid which is reacted with sulfuric acid by heating the mixture. The sulfuric acid employed may be acid of any suitable strength but concentrated sulfuric acid is preferable. The amount of sulfuric acid employed is at least about 0.38 gram per gram of chloroplatinic acid ($H_2PtCl_6.6H_2O$) and preferably at least 0.5 gram of acid is employed. The mixture is heated to the boiling point so as to hasten the evaporation. During the evaporation step, water and HCl are driven off until a yellow to orange precipitate is formed, which is short of evaporation to dryness, there being present at least a small amount of liquid which is sufficient to wet the residue.

During the heating step, in general the longer the heating the more chlorine is removed. However, the heating should not be continued too long or the precipitate will be insoluble in water. As dryness is approached, the precipitate becomes more difficult to dissolve. If heated past dryness, the precipitate turns black and can be dissolved only with great difficulty if at all. Extreme heating is neither necessary nor desirable. The extent to which evaporation is carried depends chiefly on the amount of sulfuric acid added and the amount of chlorine removal desired. If only about 0.38 gram of sulfuric acid are used per gram of chloroplatinic acid and substantially complete chlorine removal is desired, evaporation should be continued until the precipitate is almost dry. If excess sulfuric acid is used, substantially complete chlorine removal is obtained when the solution is evaporated until a substantial amount of precipitate forms and at least about one-fifth of the excess acid has evaporated. It is preferred to use at least 0.5 gram of $H_2SO_4$ per gram of $H_2PtCl_6 \cdot 6H_2O$, 0.35 gram per gram of $H_2PtBr_6 \cdot 9H_2O$, and 0.30 gram per gram of $H_2PtI_6 \cdot 9H_2O$ in order to facilitate chlorine removal.

The residue is substantially free of chlorine and renders it feasible to prepare a substantially chlorine-free catalyst composite from the precipitate. The residue or yellow to orange precipitate is then dissolved in water with or without removal of the remaining liquid from the residue prior to the dissolution. Heating the water in which the precipitate is suspended aids in causing the precipitate or residue to go into solution. The resulting solution is then used to impregnate any desired porous carrier in conventional manner, as by immersing and draining or by spraying the solution onto the carrier in a manner which assures uniform impregnation. The impregnated carrier material is then dried and calcined, usually at a temperature in the range of 300 to 1200° F. The temperature should not be unduly high so as to deleteriously affect the porosity or surface area of the carrier. During the heating or calcination, the platinum compound produced by the process is decomposed or reduced to the metal which is fixed firmly on the carrier. The metallic platinum content of the final catalyst should be in the range of about 0.01 to 5 weight percent.

Platinum-containing catalysts prepared according to the method of the present invention have a wide field of utility. For example, they can be used in processes involving dehydrogenation, hydrogenation, aromatization, cyclization, and the like. The catalysts are especially useful for reforming, or hydroforming of naphthas into gasoline stocks of improved anti-knock characteristics. Catalysts prepared according to my method are especially useful in processes requiring a chlorine-free catalyst. It is also feasible to produce Pt-containing catalysts containing a specific controlled amount of halogen such as chlorine or fluorine by first preparing a halogen free catalyst and then incorporating the desired specific amount of halogen therein. Where the final catalyst is to contain a small amount of fluorine, for instance, if it is desired to promote cracking for any reason, the fluorine may be introduced in the form of hydrofluoric acid into a slurry of alumina before or after incorporation of the platinum-containing solution on the support and its concentration may be carefully controlled in this manner. Chlorine may be introduced in a similar manner or by other conventional techniques.

The following example is provided to illustrate the invention and is not to be interpreted as unduly and unnecessarily limiting the same.

EXAMPLE

Chloroplatinic acid in the amount of 100 ml. was formed by mixing distilled water and 1/8 oz. of commercial platinum chloride. A 55 ml. portion of the chloroplatinic acid was admixed with approximately 10 ml. of C.P. 96–97% sulfuric acid and the solution was evaporated until an orange precipitate formed in the presence of a small amount of solution. Distilled water was added to the residue or precipitate without separation from the remaining solution. The mixture of precipitate and water was heated and almost all of the material went into solution.

Commercial porous alumina pills were added to the platinum-containing solution and after about seventeen minutes, excess solution was drained from the pills. The drained pills were then placed in a muffle furnace at about 100° F. and heated overnight while gradually raising the temperature to 897° F. Analysis of the resulting catalyst showed a platinum content of 0.39%. The resulting platinum-containing catalyst pellets were utilized in runs Nos. 1 and 2 for the reforming of a $C_7$ naphtha fraction and in run No. 3 for the dehydrocyclization of normal heptane. The data obtained are shown in the following table and indicate that the catalyst is highly active for both reactions.

Table

| Run No. | 1 | 2 | 3 |
|---|---|---|---|
| Process Conditions: | | | |
| Temp., °F | 858 | 909 | 940 |
| Liq. S.V., v./v./h | 3.1 | 3.2 | 1.08 |
| $H_2$/Naphtha, mol ratio | 4.2 | 4.3 | 3.44 |
| Pressure, p.s.i.g | 300 | 300 | 50 |
| Length, Hr | 2.0 | 2.0 | 1.6 |
| Product Yields, wt. Percent of Feed: | | | |
| $H_2$ | 2.1 | 2.2 | 3.7 |
| $CH_4$ | 0.2 | 0.4 | 1.3 |
| $C_2$'s | 0.2 | 1.0 | 3.9 |
| $C_3$'s | 0.2 | 2.5 | 6.8 |
| $C_4$'s | 0.3 | 3.0 | 9.6 |
| $C_5$'s | 1.1 | 3.1 | 11.6 |
| $C_6+$ | 95.9 | 87.8 | 61.6 |
| Coke | | | 1.5 |
| Total | 100.0 | 100.0 | 100.0 |
| $C_6+$ Product: | | | |
| Yield, L.V. Percent | 92.6 | 83.0 | |
| Composition, L.V. Percent— | | | |
| Olefins | 1.9 | 2.0 | 2.2 |
| Aromatics | 34.1 | 45.6 | 81.6 |
| Octane Rating: | | | |
| Research Clear | 72.0 | 81.4 | |
| Research +3 ml | 89.5 | 94.5 | |

Certain modifications of the invention will become apparent to those skilled in the art and the illustrative details disclosed are not to be construed as imposed unnecessary limitations on the invention.

I claim:
1. A process for preparing a platinum metal catalyst which comprises reacting a halo acid of a platinum metal with sulfuric acid in aqueous solution; evaporating the resulting solution until a yellow to orange precipitate forms with solution remaining; dissolving said precipitate in water; impregnating a suitable solid catalyst support with the resulting solution of precipitate; and drying and heating the impregnated support to activate the catalyst.

2. The process of claim 1 wherein said support comprises alumina.

3. The process of claim 1 wherein said support comprises silica.

4. The process of claim 1 wherein said support comprises silica-alumina.

5. The process of claim 1 wherein said halo acid is chloroplatinic acid.

6. The process of claim 1 wherein said halo acid is chloropaladic acid.

7. The process of claim 1 wherein said halo acid is bromoplatinic acid.

8. The process of claim 1 wherein said halo acid is iodoplatinic acid.

9. The process of claim 5 wherein said carrier comprises alumina.

10. The process of claim 5 wherein said carrier comprises silica.

11. The process of claim 5 wherein said carrier comprises silica-alumina.

12. A process for preparing a substantially clhorine-free platinum-containing supported catalyst which comprises reacting chloroplatinic acid with sulfuric acid; evaporating the resulting mixture until a substantially chlorine-free yellow to orange precipitate forms with solution remaining; dissolving said precipitate in water; impregnating a suitable solid catalyst support with the resulting solution; drying the support and heating the dried support at a temperature in the range of 300 to 1200° F. to form metallic platinum on said carrier.

13. The process of claim 12 wherein said support comprises alumina.

14. The process of claim 12 wherein said support comprises silica.

15. The process of claim 12 wherein said support comprises silica-alumina.

16. A process for preparing a substantially chlorine-free platinum-containing supported catalyst which comprises dissolving platinum chloride in water; admixing the resulting solution with concentrated sulfuric acid in an amount at least sufficient to react with all of the platinum chloride; heating the resulting mixture so as to concentrate same and form a substantially chlorine-free yellow to orange precipitate in the presence of solution; dissolving said precipitate in water; impregnating a porous support with last said solution; and heating the impregnated support so as to form metallic platinum on the support.

References Cited in the file of this patent

UNITED STATES PATENTS

| | | |
|---|---|---|
| 620,511 | Spier | Feb. 28, 1899 |
| 2,566,521 | Haensel | Sept. 4, 1951 |
| 2,596,145 | Grote | May 13, 1952 |
| 2,611,749 | Haensel | Sept. 23, 1952 |

OTHER REFERENCES

Mellor's "Comprehensive Treatise on Inorganic and Theoretical Chemistry," vol. 8, (1937), page 400.